May 9, 1961 J. TORO 2,983,457

MAGNETIC TAPE RECORDER

Filed Dec. 18, 1956 6 Sheets-Sheet 1

INVENTOR.
JOHN TORO

BY Lippincott & Smith

ATTORNEYS

May 9, 1961 J. TORO 2,983,457

MAGNETIC TAPE RECORDER

Filed Dec. 18, 1956 6 Sheets-Sheet 2

INVENTOR.
JOHN TORO
BY Lippincott & Smith
ATTORNEYS

May 9, 1961 J. TORO 2,983,457

MAGNETIC TAPE RECORDER

Filed Dec. 18, 1956 6 Sheets-Sheet 3

INVENTOR.
JOHN TORO

BY Lippincott & Smith

ATTORNEYS

May 9, 1961 J. TORO 2,983,457

MAGNETIC TAPE RECORDER

Filed Dec. 18, 1956 6 Sheets-Sheet 4

INVENTOR.
JOHN TORO

BY Lippincott & Smith

ATTORNEYS

May 9, 1961 J. TORO 2,983,457

MAGNETIC TAPE RECORDER

Filed Dec. 18, 1956 6 Sheets-Sheet 5

INVENTOR.
JOHN TORO

BY Lippincott & Smith

ATTORNEYS

May 9, 1961 J. TORO 2,983,457

MAGNETIC TAPE RECORDER

Filed Dec. 18, 1956 6 Sheets-Sheet 6

INVENTOR.
JOHN TORO

BY Lippincott & Smith
ATTORNEYS

United States Patent Office 2,983,457

Patented May 9, 1961

2,983,457

MAGNETIC TAPE RECORDER

John Toro, San Carlos, Calif., assignor to Toro Industries, Inc., San Carlos, Calif., a corporation of California Filed Dec. 18, 1956, Ser. No. 629,034

3 Claims. (Cl. 242—55.12)

This invention relates to magnetic tape recorders suitable for recording and reproducing sound or other quantities that can be represented by electric signals, and in particular relates to a high-quality portable tape recorder having improved tape transport and control mechanisms.

In a magnetic tape recorder, the tape must be accurately guided from a supply reel past the erase, recording, and playback heads and onto a take-up reel. The alinement of the tape as it passes the recording and playback heads is especially critical. The tape must not only move past the heads with a uniform longitudinal velocity, but also in precise and unvarying lateral alinement and without any buckling or warping. If these criteria are not met to a high degree of precision, the quality of the recorder's performance will be seriously lessened.

In conventional high-quality tape recorders, the alinement problems are met by mounting all of the tape transport mechanism in substantially coplanar relation upon a heavy rigid base plate. The spindles for the supply and take-up reels must be kept precisely parallel with each other and precisely normal to the plane of the base plate: otherwise, there will be some buckling or lateral misalinement of the tape as it moves past the recording and playback heads, which is sure to result in inferior performance. Obviously, such a heavy, rigid construction is expensive and contributes greatly to the cost of high-quality portable tape recorders. Furthermore, it is an awkward, heavy and bulky arrangement, because the coplanar arrangement of parts makes necessary a large, heavy, flat mounting plate and a correspondingly large, heavy case or cabinet.

Briefly stated, in accordance with certain aspects of the present invention, a high-quality magnetic tape recorder, that is considerably lighter, smaller, and less expensive than conventional recorders of comparable quality, is provided by mounting the supply and take-up reels on opposite parallel sides of the recorder case, and providing a novel tape guiding and transport mechanism for guiding the tape past the erase, recording, and playback heads. Adjustable inclined guide posts are utilized for guiding the tape around corners of the case in such a way that the tape automatically positions itself in accurate lateral alinement and has no tendency to buckle. With this construction, the alinement of the spindles for the supply and take-up reels is not a critical parameter in the design. The need for a large, heavy, extremely rigid mounting plate is eliminated. Consequently, the improved tape recorder is not only smaller and lighter, but is also much easier and less costly to manufacture than conventional recorders of comparable quality.

Other features and advantages of the invention will appear as the description proceeds.

The invention will be better understood from the following detailed description of an illustrative embodiment taken in connection with the accompanying drawings, and its scope will be pointed out in the appended claims. In the drawings:

Figure 2:
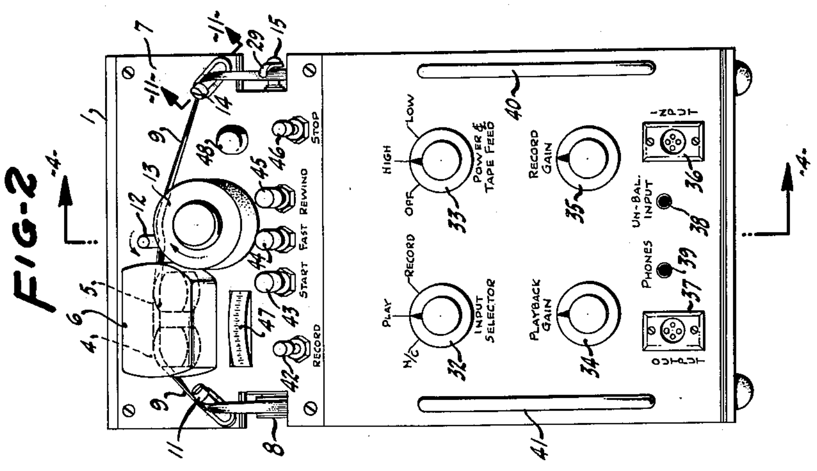
Fig. 2 is a front elevation of the same tape recorder.
Figure 1:
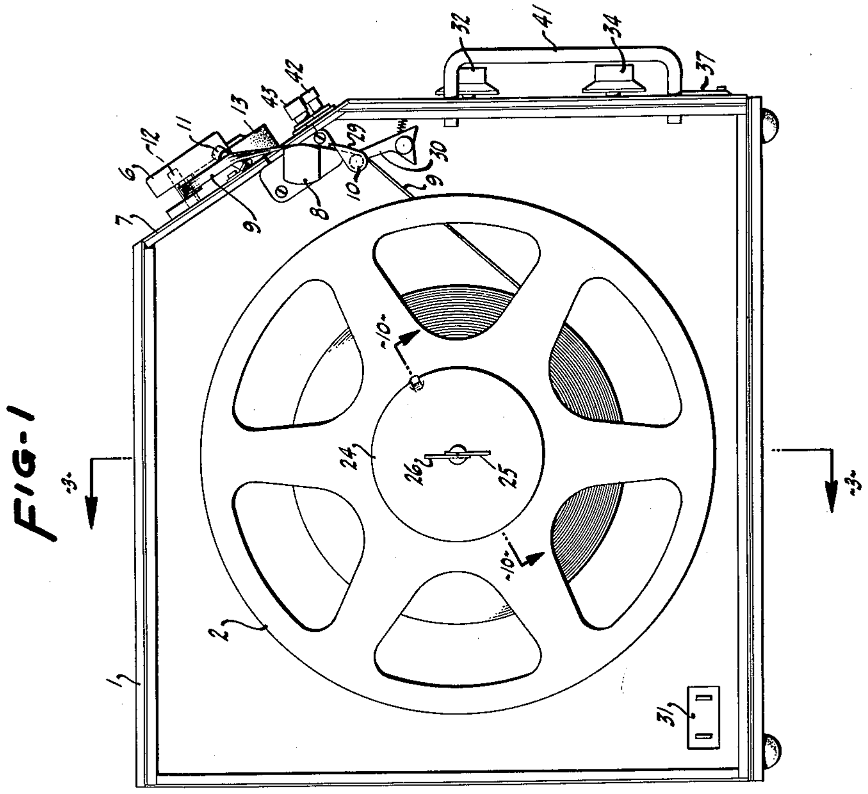
Fig. 1 is a side elevation of the improved tape recorder.

With particular reference to Figs. 1 and 2 of the drawings, the recorder is provided with a case or cabinet 1 having two recessed flat parallel opposite sides for accommodating the conventional supply and take-up reels. The supply reel 2 is clearly shown in Figs. 1 and 3, and the take-up reel 3 may be seen in Fig. 3. It will be noted that the supply and take-up reels are substantially parallel, but are not coplanar. In the preferred embodiment, the two reels are substantially in axial alinement but this is not absolutely essential, nor is it essential that the two reels be precisely parallel. The large, heavy, exceptionally rigid mounting plate that must be used in conventional high-quality tape recorders is unnecessary in the present recorder. Consequently, the improved recorder is relatively light, compact and reasonable in cost. Nevertheless, there is adequate space for the use of large professional-type reels 2 and 3 as shown in the drawing. Smaller reels can, of course, be used with equal facility whenever such is desired. Even with the greatly reduced overall physical size it is possible to leave the reels mounted on the machine, ready for use, without extending beyond the dimensions of the case as is often necessary to keep size to a minimum.

The magnetic recording head 4 and the playback head 5 are contained in a housing 6 mounted on the front of a slanted panel 7 of case 1, as is best shown in Figs. 1 and 2. The erase head 8 preferably is mounted on the same side of the case as the supply reel 2. Heads 4, 5 and 8 are electromagnetic transducers of the type commonly used for like purposes in conventional magnetic tape recorders. Heads 4 and 5 have tape-contacting faces disposed perpendicular to panel 7, while head 8 has a tape-contacting face disposed perpendicular to the side of the case on which it is mounted. A magnetic recording tape 9 is withdrawn from supply reel 2, and passes successively over a guide post 10 and the face of erase head 8. Tape 9 then passes in succession across an inclined post 11 and the faces of recording head 4 and playback head 5. The tape may be driven at a constant longitudinal velocity by a conventional drive mechanism consisting of capstan 12 and rubber-tired idler 13. Then the tape passes across another inclined post 14 and a guide post 15, and is wound upon the take-up reel 3. Posts 10 and 15 project outwardly perpendicular to the sides of the case on which they are mounted, and are in lateral tapewise alinement with supply reel 2 and take-up reel 3, respectively. (That is, the posts and reels are alined with respect to the lateral direction of the tape wound upon the reels, which is parallel to the reel axis.) Erase head 8 is in lateral tapewise alinement with supply reel 2 and guide post 10. Heads 4 and 5, capstan 12 and idler 13 are in lateral tapewise alinement with one another. (That is, the recording and playback heads and the tape driving mechanism are alined with respect to the lateral direction of the tape passing over these heads and through this mechanism which is perpendicular to panel 7.) Slanting post 11 is in lateral tapewise alinement with supply reel 2, and is also in lateral tapewise alinement with heads 4 and 5. Slanting post 14 is in lateral tapewise alinement with heads 4 and 5 and also with take-up reel 3. Posts 11 and 14 are in slanting relation to panel 7, slanting generally inward toward each other and upward toward the recording and playback heads.

Figure 11:
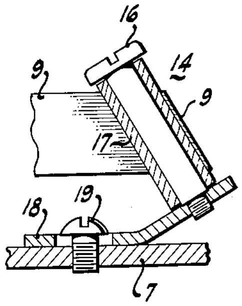
Fig. 11 is a detailed section taken generally along the line 11—11 of Fig. 2.

The inclined posts 11 and 14 play an important part in guiding and alining the tape. The preferred construction of these two posts, which are substantially identical, is best illustrated in Fig. 11.

The inclined post 14 includes a metal screw 16 threaded through a glass tube 17 and supported by a metal bracket 18. Bracket 18 is attached to the slanted panel 7 of the recorder case by means of a single screw 19 extending through an oversized hole in bracket 18, as shown. Bracket 18 is bent so that screw 16 and glass sleeve 17 form an inclined post extending at an angle of approximately 60 degrees to the surface of panel 7. Because of the adjustment features hereinafter explained, this angle between the slanting post and the panel is not critical, and precise manufacturing tolerances need not be maintained. In other words, a difference of several degrees either way in the 60 degree angle is relatively unimportant.

Tape 9 passes across the cylindrical outer surface of glass tube 17. Because the hardness and wear-resistance qualities of glass, the effects of wear upon the slanting posts are negligible. The position of the slanting post can be adjusted by loosening the screw 19. The oversized hole in bracket 18 permits some lateral movement of the post upon panel 7. Furthermore, bracket 18 can be turned to adjust the angular orientation of the slanting post with respect to panel 7. (That is, to adjust the angular orientation of the projection of the post on the panel.) Once the post has been adjusted to a desired position, it is locked in place by tightening screw 19.

Again referring to Figs. 1 and 2, posts 11 and 14 and the adjustment of their positions have important effects upon the alinement of tape 9. Consider post 11, for example. As the tape comes off the supply reel and passes over guide post 10 and the face of erase head 8, the lateral direction of the tape is parallel to the plane of panel 7. As the tape crosses the faces of recording head 4 and playback head 5, its lateral direction is perpendicular to the plane of panel 7. The transition between these two different orientations of the tape must be made without buckling of the tape and without unequally stressing or stretching opposite edges of the tape. The bending of the tape over the slanting post 11 accomplishes the necessary change in orientation in the desired manner.

The slant of post 11 relative to the tape (not relative to panel 7) is very critical, because if the slant is too small the tape will tend to ride up on the post and move too far upward away from panel 7 as it passes across heads 4 and 5. On the other hand, if the slant of post 11 relative to the tape is too large, the tape will tend to ride down on the post and move too far downward toward panel 7 as it crosses heads 4 and 5. By rotating post 11 and its mounting bracket as a unit, the slant of the post relative to the tape can be adjusted to a position at which the tape becomes self-alining and passes across the faces of heads 4 and 5 in precisely the correct lateral position.

Moving the post 11 laterally on panel 7, as is permitted by the oversized hole in its mounting bracket, adjusts the lateral position of the tape as it crosses erase head 8 and also adjusts the direction toward which the tape is withdrawn from supply reel 2, thereby insuring that the tape will run true as it leaves the supply reel and will not drag against the sides of the reel.

Post 14 is adjusted in a similar manner. The post and its mounting bracket are rotated as a unit to adjust the angle between the slanting post and the tape to a value at which the tape is self-alining and runs true across the recording and playback heads in correct lateral alinement. Post 14 is positioned laterally on panel 7 to make the tape run true as it enters the take-up reel and to prevent any dragging of the tape against the edges of the reel.

A very significant aspect of this novel tape-guiding system is that the adjustment of posts 11 and 14 as hereinbefore explained insures that the tape will run true and will maintain itself in correct lateral alinement without any necessity for precise alinement between the supply and take-up reels and the recording and playback heads. It is not even necessary that the supply and take-up reels be exactly parallel, or that their spindles be in exact alinement. By this means many manufacturing difficulties are avoided, manufacturing tolerances can be increased, and the need for a large heavy, rigid mounting plate is eliminated. Substantial manufacturing economies are obtained and at the same time the recorder is made considerably smaller and lighter than prior recorders of comparable quality.

Figure 10:
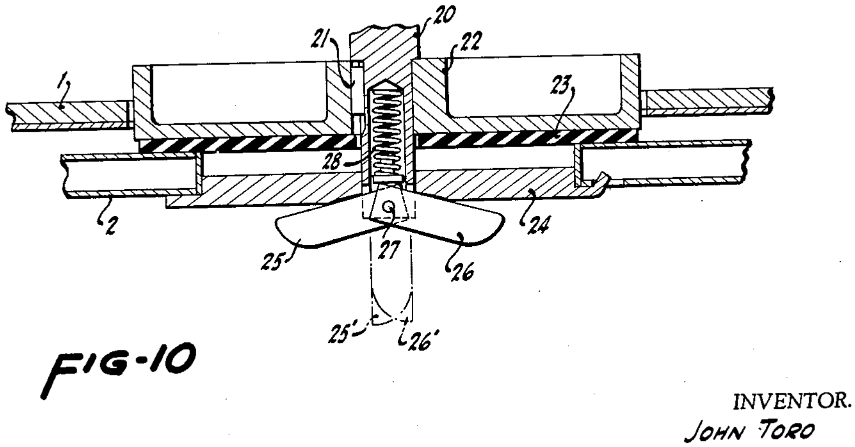
Fig. 10 is a section taken generally along the line 10—10 of Fig. 1.

The manner in which reels 2 and 3 are attached to their spindles is best illustrated in Figs. 1 and 10. The two rotative spindles project outward through and substantially perpendicular to the two opposite sides of the case. Reel 2, for example, is a conventional professional-type large reel holding a considerable length (2500 feet, for example) of conventional magnetic recording tape. Reel 3 is similar. Mounted on rotative spindle 20, and rotating therewith by virtue of the key 21, there is a driving disc 22 that projects slightly beyond the side of case 1 through a circular hole therein, as shown in Fig. 10. The outer face of disc 22 is covered with a somewhat resilient non-skid material such as a layer of rubber 23. A discoid hub 24 fits over the outer end of spindle 20, as shown, and engages the center portion of reel 2 for holding the reel securely in place on the spindle and securely against non-skid rubber layer 23. By this means the reel is held in axial alinement with the spindle and in frictional engagement with disc 22, so that reel 2 and spindle 20 rotate together as a unit.

Hub 24 is held in place on spindle 20 by means of two flat metal flippers or fingers 25 and 26 that are pivotally attached to the outer end of spindle 20 by means of a pin 27. The inner ends of the flippers are squared-off, as shown in Fig. 10, and fit side-by-side within a longitudinal slot in the outer end of the spindle. The outer ends of the two flippers are adapted to extend outward transversely on opposite sides of the spindle. An axial bore within the end of spindle 20 contains a small compression spring 28 that presses against the inner ends of flippers 25 and 26 in the manner illustrated. Thus, when the flippers are flipped outward spring 28 presses against the corners of the ends of the two flippers and tends to force them into a more spread-apart position, and the two flippers press inward on hub 24 to hold it securely in place.

When removal of the reel 2 is desired, flippers 25 and 26 are simply pressed together into the broken line positions indicated at 25′ and 26′. In this position spring 28 presses against the squared-off ends of the flippers and keeps them in a position substantially alined with the axis of spindle 20. Now hub 24 and reel 2 can quickly and easily be removed.

It is evident that this improved means for fastening the reels upon the spindles makes it very easy to change reels whenever desired. Furthermore, smaller reels can be substituted whenever desired. When the small reels are used, hub 24 is omitted and the reel itself is held firmly against the non-skid rubber layer 23 by flippers 25 and 26. Still another advantage of the improved reel-fastening means is that it projects but a very short distance beyond the reels themselves, and thus offers no obstacle to placing the entire recorder in a small, compact carrying-case, and being attached to the shaft are not subject to being lost or misplaced.

Figure 4:
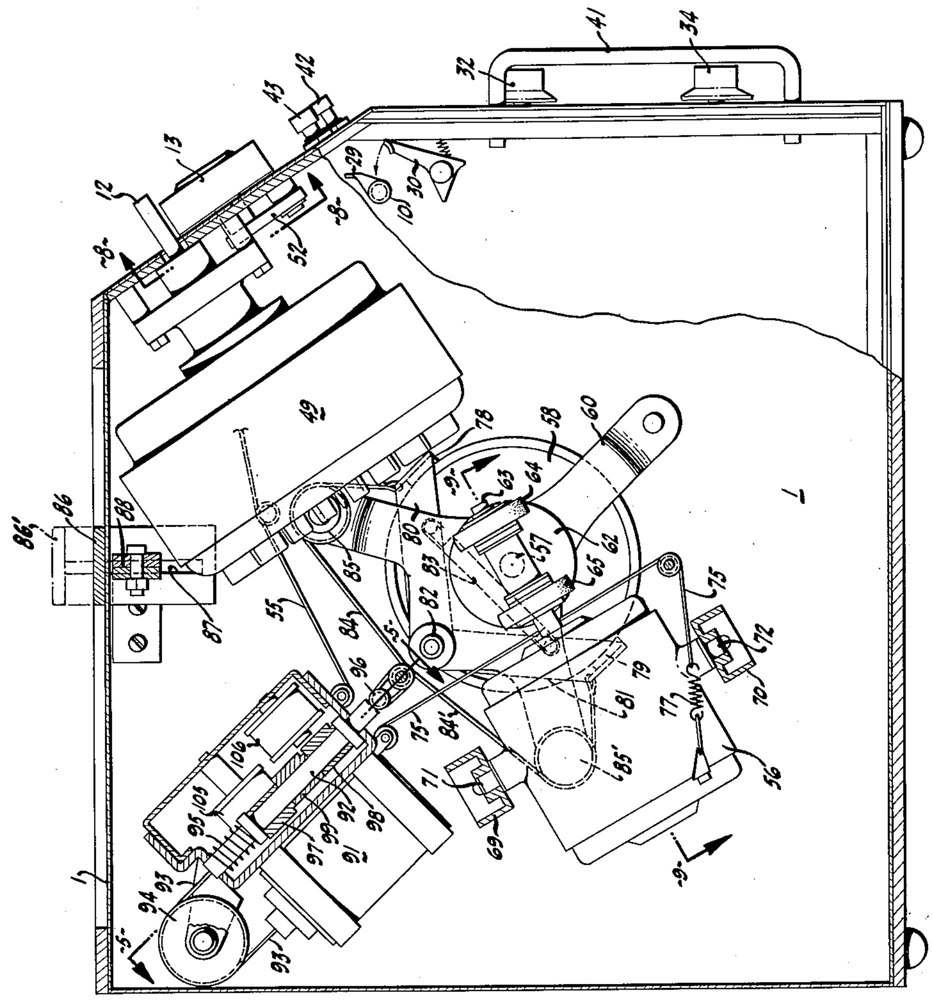
Fig. 4 is a section taken generally along the line 4—4 of Fig. 2.

Again referring in particular to Figs. 1 and 2, each of the guide posts 10 and 15 has a flat metal cap 29 with an inwardly bent tab, as is best shown in Figs. 1, 2 and 4. These tabs help to hold the tape in place and prevent it from slipping off the guide posts if for any reason any slack develops in the tape. Thus the tape is securely held in place at all times, and yet threading and unthreading the tape is exceptionally simple. The reels are simply placed on their spindles, with an adequate loop of tape between the two reels, then the tape is looped over the several magnetic heads, dropped between capstan 12 and idler 13, and pushed behind caps 29 and under tabs thereon in a quick, easy and practically effortless manner.

After the tape is in place against guide post 10, a drag lever 30, best shown in Figs. 1 and 4, is flipped into position against the tape, with the tape between drag member 30 and post 10. The purpose of the drag member is to exert a slight, constant restraint against motion of the tape past post 10, to keep a constant tension on the tape as it is pulled past the several magnetic heads by capstan 12 and idler 13. This tension is constant regardless of the diameter or angle from which the tape is being fed, thus being constant as tape supply changes the diameter or angle of tape takeoff from reel.

Other parts that can be seen in Figs. 1 and 2 include an electrical plug 31 for receiving the cord that connects the recorder to an electrical outlet or other electrical supply, conventional dials 32, 33, 34 and 35 for adjusting the amplifier gain and other parameters in the electrical circuits, sockets 36 and 37 for accommodating input and output electrical connections, and jacks 38 and 39 for the connection of unbalanced electrical input lines and monitoring earphones. The dials on the vertical front panel of the case are protected by guards 40 and 41. On the slanting panel 7 of the case there are five pushbuttons 42, 43, 44, 45 and 46 for pushbutton control of the recorder in a manner hereinafter described. A small electric meter 47 is provided for monitoring input and output signal levels. An indicator lamp 48 lights when record-erase function is operative.

Figure 8:
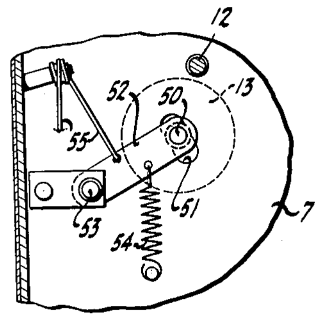
Fig. 8 is a detailed section taken generally along the line 8—8 of Fig. 4.

During recording and playback, the tape is driven at constant speed by a conventional capstan drive mechanism. This drive mechanism, which is best shown in Figs. 2, 4 and 8, includes a capstan 12 and a rubber-tired idler 13. Capstan 12 is rotated at constant speed by an electrical motor 49 continuously as long as the electric power of the recorder is turned on. Idler 13 is mounted on a shaft 50 that extends through a slot 51 in panel 7 and is attached to the outer end of a lever 52 that is pivoted at 53. A spring 54 attached to lever 52, as shown in Fig. 8, tends to pull idler 13 away from capstan 12. During recording and playback, idler 13 is pulled toward capstan 12 by a cable 55 connected between lever 52 and control mechanism hereinafter described.

The magnetic recording tape 9 passes between capstan 12 and idler 13. When the idler is pulled away from the capstan by spring 54, rotation of the capstan has no appreciable effect upon movement or lack of movement of the tape. In this case movement of the tape is controlled solely by rotation of the supply and take-up reels. However, during recording and playback, when cable 55 pulls idler 13 toward capstan 12, the tape is securely gripped between the idler and the capstan, and the tape is pulled past the magnetic head at a constant speed by the rotation of capstan 12.

Figure 3:
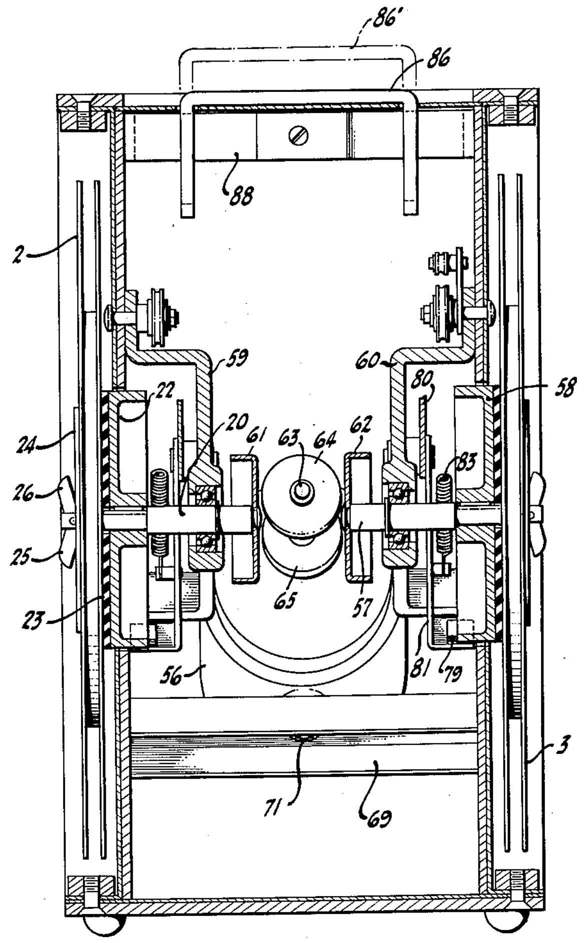
Fig. 3 is a section taken generally along the line 3—3 of Fig. 1.
Figure 9:
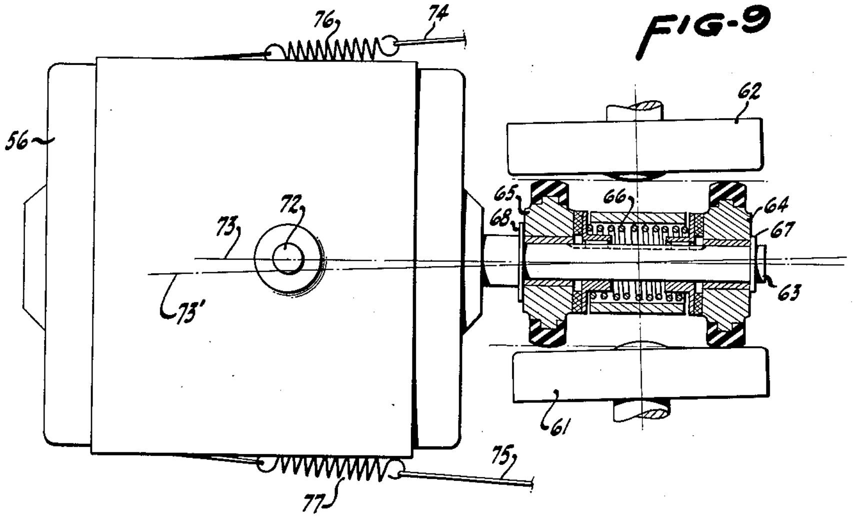
Fig. 9 is a section taken generally along the line 9—9 of Fig. 4.

The mechanism for driving the supply reel 2 and take-up reel 3 is best shown in Figs. 3, 4 and 9. Motive power for driving the supply and take-up reels is supplied by an electric motor 56. In the preferred embodiment illustrated, motor 56 supplies torque directly to only one reel at a time and the other reel is rotated by the pull of the tape. During forward motions of the tape, as (for example) during recording and playback, motor 56 supplies torque to take-up reel 3 so that the tape will be wound upon the take-up reel as fast as it passes through the capstan-and-idler driving mechanism. The tape is simply pulled off of supply reel 2 by the tape driving mechanism, and undue slack is prevented by the restraint imposed by normal friction forces.

For rewinding the tape, motor 56 supplies torque to supply reel 2, moving the tape in the opposite direction, to rewind the tape onto reel 2. While this is being done the tape is simply pulled off reel 3 by the tension of the tape, and excess slack is prevented by normal friction forces. If in either case the undriven reel tends to run away and produce excessive slack in the tape, this condition can be corrected by adding a small felt pad or the like pressing against one of the rotating parts to provide additional friction.

As hereinbefore explained, supply reel 2 is mounted on a rotative spindle having attached thereto a disc 22, which also acts as a brake drum as hereinafter explained. In a similar manner, take-up reel 3 is mounted on a rotative spindle 57 to which there is attached a disc 58. Spindles 20 and 57 are preferably, but not necessarily precisely, in axial alinement. Spindles 20 and 57 are rotatively supported in bearings at the ends of supporting brackets 59 and 60 that are attached to opposite sides of case 1, as shown.

A metal disc 61 is attached to the inner end of spindle 20, and a metal disc 62 is attached to the inner end of spindle 57. Preferably, these two discs are substantially, but not necessarily precisely, parallel and in axial alinement. The shaft 63 of motor 56 extends transversely and substantially midway between discs 61 and 62, as is best shown in Fig. 9. Two rubber-tired wheels 64 and 65 are mounted on shaft 63 with their peripheries respectively adjacent to diametrically opposite portions of discs 61 and 62. Wheels 64 and 65 are not rigidly attached to shaft 63, but are in frictional engagement therewith, so that wheels 64 and 65 can slip relative to shaft 63 while transmitting torque developed by rotation of the motor shaft. This may be accomplished, for example, by providing a somewhat loose fit between shaft 63 and wheels 64 and 65, and then providing a compression spring 66 between the two rubber-tired wheels for forcing wheels 64 and 65 apart and into frictional engagement with collars 67 and 68 that are rigidly attached to the shaft. In other words, wheels 64 and 65 are attached to shaft 63 through a friction clutch, which permits the motor to be in rotation before engagement of tires, insuring a fast acceleration of reel with minimum slippage of rubber tire surface on disc 61 or 62.

Motor 56 is supported by brackets 69 and 70 that extend transversely across the recorder case 1. Motor 56 is pivotally supported at 71 and 72, so that the motor can be rotated slightly about a transverse axis. Such rotation moves shaft 63 toward disc 61 or toward disc 62, selectively. Furthermore, the axis of shaft 63 is slightly inclined relative to a plane passing midway between and parallel to discs 61 and 62. This is best illustrated in Fig. 9, where broken line 73 represents the axis of shaft 63 and broken line 73' represents the plane midway between and parallel to the inner faces of discs 61 and 62. Consequently, disc 61 is always closer to wheel 64 than to wheel 65, while disc 62 is always closer to wheel 65 than to wheel 64.

When motor 56 is rotated about its pivots 71 and 72 in the clockwise direction as viewed in Fig. 9, rubber-tired wheel 64 is brought into firm frictional engagement with disc 61, and motor 56 then supplies torque through wheel 64 to disc 61, and spindle 20 tends to rotate supply reel 2 and to wind the tape 9 onto the supply reel. In other words, the position of motor 56, as illustrated in Fig. 9, is the rewind position of the reel driving mechanism.

When motor 56 is rotated slightly counterclockwise, wheel 64 is disengaged from disc 61 and wheel 65 comes into firm, frictional engagement with disc 62. Now motor 56 supplies torque to spindle 57 and take-up reel 3 for winding the tape upon the take-up reel.

Motor 56 is moved to either of its two positions, selectively, by cables 74 and 75 that are connected between the motor and control apparatus hereinafter described. A spring 76 is connected in series with cable 74, as shown in Fig. 9, so that when he control mechanism pulls upon cable 74 spring 76 is stretched, and the spring tension provides the force needed to hold rubber-tired wheel 64 in firm frictional engagement with disc 61. Similarly, a spring 77 is connected in series with cable 75, so that when the control mechanism pulls upon cable 75, spring 77 is stretched, and the spring tension provides the force needed to hold rubber-tired wheel 65 in firm frictional engagement with disc 62.

Whenever movement of the tape in either direction is to be stopped, rotation of reels 2 and 3 should be stopped abruptly to avoid the occurrence of either strain which might damage the tape or the unwinding of excess tape from the reel and the creation of undesirable slack in the tape. For abuptly stopping rotation of the reels, brakes are provided that at appropriate times engage the drum-like rims of discs 22 and 58. Identical sets of brakes are provided for stopping the rotations of both reels.

The brakes that engage the drum-like edge of disc 58 for stopping rotation of take-up reel 3 are best shown in Fig. 4. Two brake shoes 78 and 79 are mounted at the ends of two levers 80 and 81 that are rotative about a common pivot at 82. A spring 83 is connected between the two arms 80 and 81, and tends to pull the two arms together and thus to bring brakes 78 and 79 into frictional engagement with the rim of disc 58. For disengaging the brakes, cables 84 and 84′ are attached to arms 80 and 81 and threaded over a system of pulleys 85 and 85′ so that brakes 78 and 79 are pulled away from the rim of disc 58 when a control mechanism hereinafter described pulls upon cables 84 and 84′. A similar brake system operates in association with disc 22.

A carrying handle for the recorder is formed by an inverted U-shaped metal strap 86, best illustrated in Figs. 3 and 4, having two legs that extend downward through slots in the top of case 1. The two legs of strap 86 contain slots 87 through which passes a horizontal bar 88 rigidly mounted inside of case 1. Bar 88, which for convenience of assembly may be made of several parts bolted together as shown, attaches strap 86 to case 1 while permitting some vertical movement of the strap relative to the case. When the handle is not in use, strap 86 lies flat against the top of case 1, as is shown by full lines in Figs. 3 and 4. When the strap is lifted, it moves upward relative to the case until the bottoms of slots 87 engage the lower edge of transverse bar 88, whereupon upward movement of strap 86 relative to case 1 is prevented and any further lifting of the strap will lift the case and the entire recorder. This raised position of strap 86 is indicated at 86′ by broken lines in Figs. 3 and 4. In the raised position strap 86 forms a convenient and rugged handle for carrying the recorder.

Figure 5:
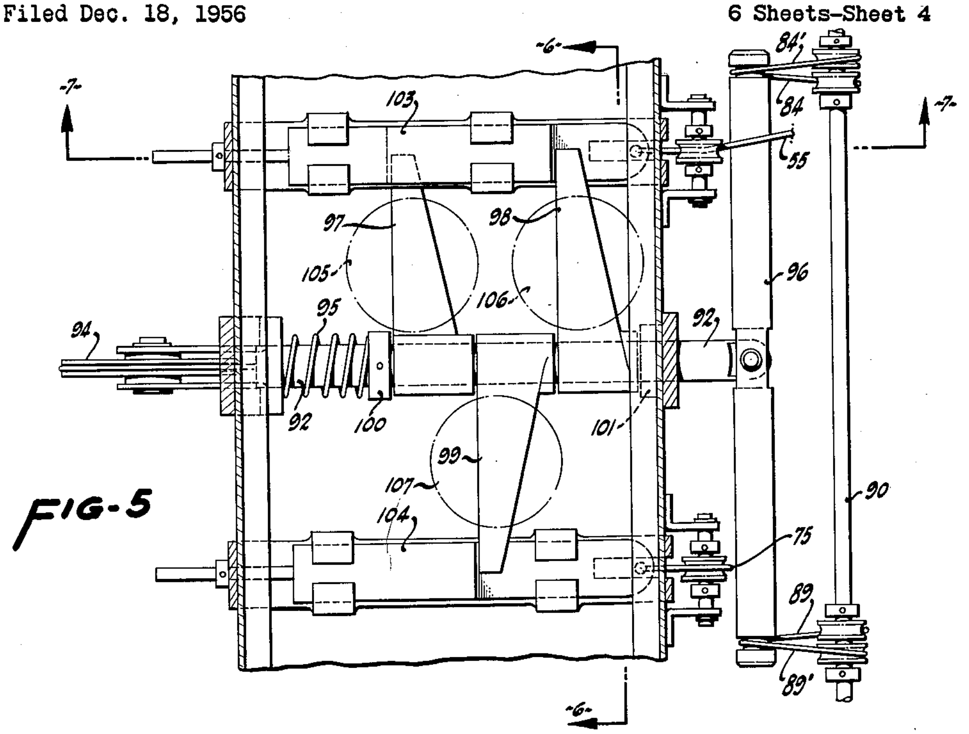
Fig. 5 is an enlarged detailed section taken generally along the line 5—5 of Fig. 4.

Particular reference is now made to Figs. 4 through 7. As hereinbefore explained, a pull on cable 55 moves idler 13 toward capstan 12 and thus engages the conventional capstan drive that moves the tape lengthwise at constant speed during recording and playback. A pull on cable 75 causes motor 56 to supply torque to the take-up reel for winding the tape onto the take-up reel. A pull on cable 74 causes motor 56 to apply torque to the supply reel for rewinding the tape on the supply reel and thus moving the tape in the reverse direction through the tape guiding and transport mechanism. A pull on cables 84 and 84′ releases brakes 78 and 79. When there is no pull on cables 84 and 84′, brakes 78 and 79 grip the drum-like periphery of disc 58 for abruptly stopping rotation of the take-up reel. In a similar manner, cables 89 and 89′ are operated to release the brakes associated with the supply reel. Cables 84, 84′, 89 and 89′ pass over pulleys mounted on shaft 90, as shown in Fig. 5.

A novel control system is employed for pulling on appropriate ones of the cables at selected times for controlling the operation of the recorder. The control mechanism includes a single actuating solenoid 91 that supplies the force required for pulling all of the cables. A longitudinally movable actuator bar 92 is connected to solenoid 91 through a cable 93 that passes over a pulley 94. A spring 95 forces actuator bar 92 towards the right and keeps cable 93 taut. Whenever solenoid 91 is energized, the solenoid pulls on cable 93 and this pulls actuator bar 92 towards the left, compressing spring 95 and pulling upon selected ones of the control cables in a manner hereinafter explained.

The center of a crossbar 96 is pivotally attached to the right end of actuator bar 92, as is best shown in Fig. 5. Cables 84 and 84′ are, in fact, the two end halves of a single cable that is looped around one end of crossbar 96, as shown. Similarly, cables 89 and 89′ are, in fact, the two end halves of a single cable that is looped around the other end of crossbar 96. With this arrangement, substantially equal tension is applied to all four of the cables 84, 84′, 89 and 89′ whenever actuator bar 92 is moved toward the left by actuation of solenoid 91. Consequently, whenever solenoid 91 is energized the supply reel and take-up reel brakes are simultaneously released so that both reels can rotate, and whenever solenoid 91 is de-energized the same brakes are simultaneously re-engaged for abruptly stopping the rotations of both reels.

Three latches 97, 98 and 99 are mounted upon actuator bar 92. Each of the three latches is a metal finger having its inner end bent around bar 92 and its outer end extending outward transversely from bar 92 so that the finger can rotate about the axis of the actuator bar. Latches 97 and 98 extend out to one side of bar 92, one on an upper level and one on a lower level, as shown in Fig. 5, while latch 99 extends outward to the other side of bar 92. The three latches are alined in abutting relation to one another on the actuator bar, and are held in longitudinal position on bar 92 by means of collars 100 and 101. When bar 92 is moved to the left by actuation of solenoid 91, collar 101 forces latches 97, 98 and 99 to move toward the left also. When the solenoid is de-energized and bar 92 moves toward the right, collar 100 moves latches 97, 98 and 99 toward the right.

In the engaged positions of the latches, the outer ends of latches 97, 98 and 99 abut on transverse shoulders of three slides, 102, 103 and 104, respectively. When so engaged, each latch moves its associated slide toward the left whenever actuator bar 92 is moved toward the left by actuation of solenoid 91. The latches are normally in the engaged position, but each may be moved to a disengaged or "unlacthed" position, out of abutting relation with the shoulder of the associated slide, by means hereinafter described.

Slide 102 is connected to cable 74, so that cable 74 is pulled upon whenever slide 102 is moved to the left by latch 97. As hereinbefore explained, this causes motor 56 to supply torque to supply reel 2 for rewinding the tape on the supply reel. Slide 103 is attached to cable 55 so that cable 55 is pulled upon whenever slide 103 is moved toward the left by latch 98. As hereinbefore explained, this pulls idler 13 toward capstan 12 for engaging the capstan drive that pulls the tape past the recording and playback heads. Slide 104 is attached to cable 75 so that cable 75 is pulled upon whenever slide 104 is moved toward the left by latch 99. As hereinbefore explained, this causes motor 56 to supply torque to take-up reel 3 for winding the tape upon the take-up reel.

Since torque is never supplied to the supply and take-up reels simultaneously, latches 97 and 99 may, if so desired, be rigidly connected together, or made from a single piece of metal, so that whenever latch 97 is in the engaged position latch 99 will be in disengaged position and vice versa.

Each of the three latches 97, 98 and 99 can be disengaged or "unlatched" by raising the end of the latch slightly so that it clears the shoulder of the associated slide. When the latches are disengaged, the movement of actuator bar 92 upon actuation of solenoid 91 has no effect upon the slides associated with disengaged latches.

For selectively lifting the latches to disengaged positions, as well as for performing electrical switching operations hereinafter described, there are provided three conventional relays 105, 106 and 107. In Fig. 5 the relays are actually above the plane of the figure, but the outline of the relays is shown by broken lines so that the relation of the relays to the latches can be clearly understood.

Figure 6:
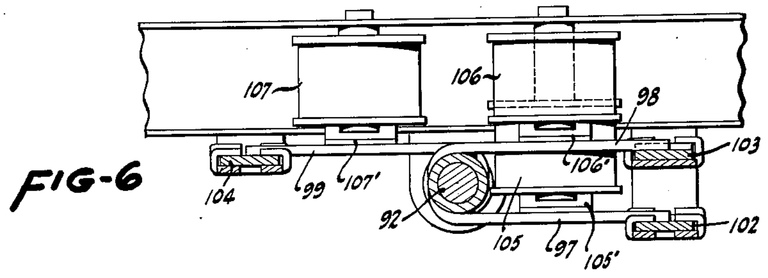
Fig. 6 is a fragmentary section taken along the line 6—6 of Fig. 5.
Figure 7:
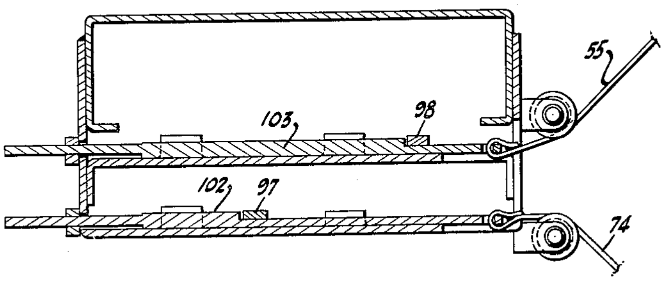
Fig. 7 is a fragmentary section taken along the line 7—7 of Fig. 5.

The electrical contacts of the relays are conventional and are not shown in the drawings, but small portions of the conventional relay armatures that operate the switch arms can be seen in Fig. 6 and are identified by the reference numerals 105', 106' and 107'. When the relays are de-energized, the three relays armatures press down on the tops of the three latches 97, 98 and 99 for holding the latches in their normal engaged positions. When a relay is energized, magnetic attraction lifts the armature for actuating the electrical contacts of the relay, and the same magnetic attraction also lifts the associated latch to its disengaged position, in which the latch clears the shoulder of the associated slide so that movement of actuator bar 92 will not move that slide nor pull upon the cable attached thereto.

Figure 12:
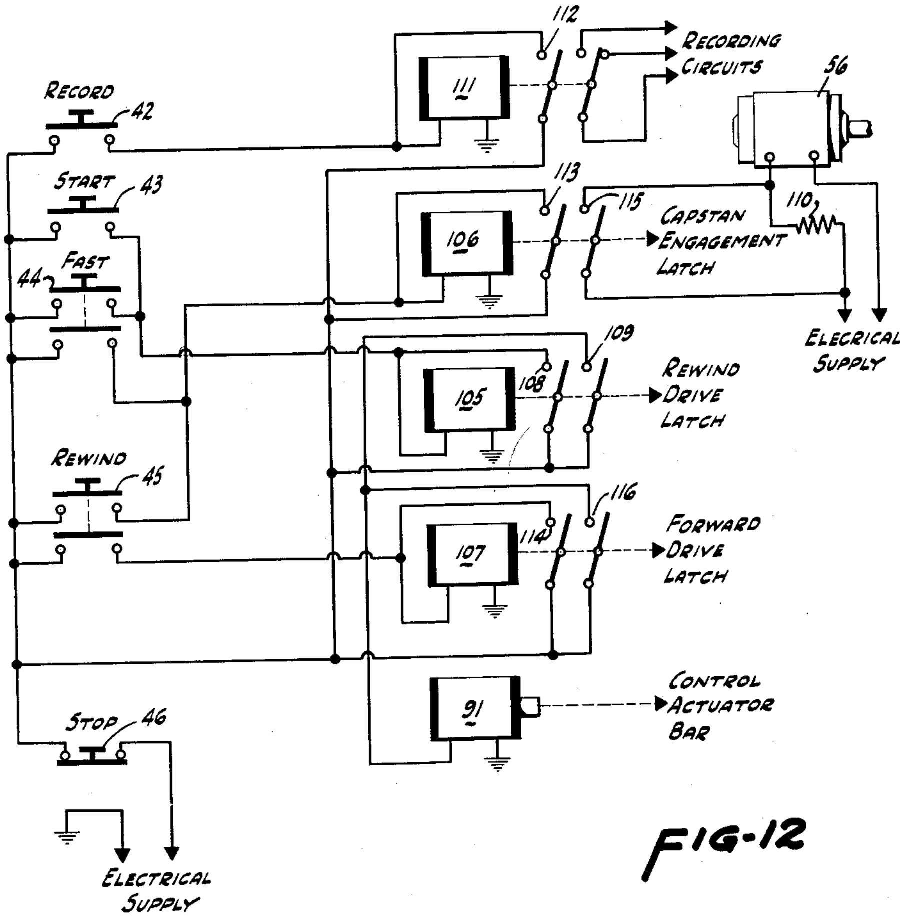
Fig. 12 is a schematic diagram of the electrical control circuit.

Fig. 12 shows the electrical circuit whereby the operation of the recorder is controlled by pushbuttons 42 through 46 mounted on slanting panel 7. Input selector dial 32 is turned to the desired position, dial 33 is adjusted to turn on the electric power and to set the capstan speed at either a high or a low value, depending upon the tape speed desired, and the gain-control dials 34 and 35 are appropriately adjusted.

To start the tape moving past the recording and playback heads at normal speed, "start" pushbutton 43 is depressed momentarily. This closes an electrical circuit that energizes relay 105. A holding contact 108 keeps relay 105 energized after pushbutton 43 is released. As relay 105 picks up, it lifts latch 97 to the disengaged position and closes an electrical contact 109 that completes an electric circuit for energizing solenoid 91. Operation of solenoid 91 moves actuator bar 92 (Fig. 5) to the left and thereby pulls upon cables 84, 84' 89 and 89' for releasing the brakes to permit the supply and take-up reels to rotate. Since latch 97 was lifted to the disengaged position by relay 105, slide 102 does not move and there is no substantial pull upon the cable 74. But latches 98 and 99 remain in the engaged position, and as actuator bar 92 is pulled to the left by solenoid 91, slides 103 and 104 move to the left and pull upon cables 55 and 75.

The pull upon cable 55 moves idler 13 toward capstan 12 and grips tape 9 between the idler and the capstan. Now the capstan draws tape 9 at constant speed past erase head 8, recording head 4 and playback head 5. The pull upon cable 75 causes motor 56 to supply torque to take-up reel 3 for winding tape upon the take-up reel as fast as it comes from the capstan tape-driving mechanism. Since the tape is now moving through the tape-driving mechanism at relatively low speed, the maximum power of motor 56 is not needed for driving the take-up reel, and accordingly a speed-reducing resistor 110 is connected in series with motor 56, as shown.

Tape 9 is now moving past the heads at an appropriate speed for either recording or playback. When one wishes to start recording, pushbutton 42 is depressed momentarily. This energizes a relay 111 having contacts for making suitable connections in the recording circuits. A holding contact 112 keeps relay 111 energized after pushbutton 42 is released.

To stop the tape, pushbutton 46 is depressed momentarily. When pushbutton 46 is depressed, the electrical circuits to all of the control relays are interrupted, and all of the relays drop out. Solenoid 91 is also de-energized. When solenoid 91 is de-energized, spring 95 moves the control actuator bar 92 to the right, thereby substantially releasing the pull upon all of the control cables. Idler 13 moves away from capstan 12 and the capstan stops driving the tape. Simultaneously, the brakes abruptly stop the rotation of supply reel 2 and take-up reel 3.

Now assume that it is desired to rewind the tape upon the supply reel. Pushbutton 45 is depressed momentarily, and this completes electric circuits for energizing relays 106 and 107. Holding contacts 113 and 114 keep relays 106 and 107 energized after pushbutton 45 is released. As relay 106 picks up, if lifts latch 98 to the disengaged position and closes an electrical contact 115 that bypasses resistor 110, whereupon motor 56 begins to run at a higher speed. As relay 107 picks up, it lifts latch 99 to the disengaged position and closes an electrical contact 116 that completes a circuit for energizing solenoid 91.

When solenoid 91 is energized, it moves actuator bar 92 toward the left and releases the brakes so that the supply and take-up reels can rotate. Because latches 98 and 99 have been lifted to disengaged positions by relays 106 and 107, slides 103 and 104 do not move as bar 92 moves toward the left. Since there is no pull upon cable 55, the capstan tape drive remains disengaged. As bar 92 moves toward the left latch 97 moves slide 102 toward the left and pulls upon cable 74. This causes motor 56 to supply torque to supply reel 2, so that the supply reel rotates and rewinds the tape upon the supply reel. Motor 56 is now operating at its maximum speed and the tape is rewound quickly. To stop the tape, it is again only necessary to depress pushbutton 46 momentarily, whereupon all the relays drop out and solenoid 91 is de-energized.

Sometimes it is desirable to move the tape in a forward direction at high speed. This is accomplished by momentarily depressing pushbutton 44. This closes electrical circuits that energize relays 105 and 106. As the two relays pick up, they lift latches 97 and 98 to their disengaged positions, and as actuator bar 92 is moved to the left by solenoid 91 the only one of three slides that is moved to the left is slide 104. Motor 56 is now operating at its maximum speed, and it rotates the take-up reel 3 for winding the tape onto the take-up reel. The capstan tape drive remains disengaged, and tape is transferred at high speed from the supply reel to the take-up reel. Movement of the tape can be stopped by momentarily depressing pushbutton 46.

It should be understood that this invention in its broader aspects is not limited to the specific embodiment herein illustrated and described, and that the following claims are intended to cover all changes and modifications that do not depart from the true spirit and scope of the invention.

What is claimed is:

1. A magnetic tape recorder comprising a panel having a front, spindles for mounting a supply reel and a take-up reel behind said panel and substantially perpendicular thereto, two tape-guide posts projecting from the front of said panel in slanting relation thereto, one of said posts being approximately in lateral tapewise alinement with said supply reel and the other of said posts being approximately in lateral tapewise alinement with said take-up reel, each of said posts being mounted upon a bracket fastened to said panel by means of a screw extending through an oversized hole so that by loosening the screw the angular orientation and lateral position of the post relative to the panel can be adjusted, an electromagnetic transducer head mounted on the front of said panel between and in lateral tapewise alinement with said posts, said head having a tape-contacting face disposed substantially perpendicular to said panel, and a tape-driving device mounted in lateral tapewise alinement with said head.

2. A magnetic tape recorder comprising a case having first and second recessed parallel opposite sides and a panel extending between said sides perpendicular thereto, a spindle for mounting a supply reel adjacent and parallel to said first side, a spindle for mounting a take-up reel adjacent and parallel to said second side, a first guide post mounted perpendicular to said first side and in lateral tapewise alinement with said supply reel, a magnetic erase head mounted on said first side in lateral tapewise alinement with said first guide post, said erase head having a tape-contacting face disposed substantially perpendicular to said first side, a second guide post projecting outward from said panel in lateral tapewise alinement with said erase head, a third guide post projecting outward from said panel in lateral tapewise alinement with said take-up reel, a fourth guide post mounted perpendicular to said second side in lateral tapewise alinement with said take-up reel, said second and third guide posts being mounted in slanting relation to said panel, said second guide post slanting generally toward said third guide post and generally away from said erase head, said third guide post slanting generally toward said second guide post and generally away from said fourth guide post, each of said second and third guide posts being adjustably mounted on said panel so that their angular orientations and lateral positions relative to said panel are independently adjustable, magnetic recording and playback heads mounted upon said panel between and in lateral tapewise alinement with said second and third guide posts, said recording and playback heads having tape-contacting faces disposed substantially perpendicular to said panel, and a tape-driving device mounted between and in lateral tapewise alinement with said recording and playback heads and said third guide post.

3. A magnetic tape recorder comprising an electromagnetic transducer head, a supply-reel spindle, a take-up reel spindle, a normally disengaged tape-driving mechanism, a motor, two normally-engaged brake mechanisms for preventing rotation of respective ones of said two spindles, first and second cables operable to disengage respective ones of said brake mechanisms for permitting said spindles to rotate, a third cable operable for engaging said tape-driving mechanism, two-position clutch means for connecting said motor to supply torque either to said supply-reel spindle or to said take-up reel spindle selectively, a fourth cable operable to move said clutch means to one of its two positions for supplying torque to said supply-reel spindle, a fifth cable operable to move said clutch means to the other of its two positions for supplying torque to said take-up reel spindle, a control actuator bar, a solenoid operable to move said actuator bar longitudinally, a crossbar pivoted at its center to an end of said actuator bar, said first and second cables being attached to opposite ends of said crossbar so that operation of said solenoid releases both of said brake mechanisms simultaneously, three longitudinally movable slides disposed parallel to said actuator bar, each of said slides having a transverse shoulder, three latches mounted upon said actuator bar and rotative about its axis, each of said latches extending outward transversely from said actuator bar and being adapted to abut on the shoulder of a respective one of said slides so that longitudinal movement of the actuator bar moves said latches longitudinally for moving said slides longitudinally, said third, fourth and fifth cables being connected to respective ones of said slides so that longitudinal movement of one slide engages said tape-driving mechanism, longitudinal movement of a second slide causes said motor to supply torque to said supply-reel spindle, and longitudinal movement of a third slide causes said motor to supply torque to said take-up reel spindle, three electromagnetic devices operable for lifting respective ones of said latches out of abutting relation with said shoulders of said slides so that the latches so lifted will not move the corresponding slide when said solenoid is actuated, and electrical switching means for operating said electromagnetic devices and said solenoid.

References Cited in the file of this patent

UNITED STATES PATENTS

| | | |
|---|---|---|
| 257,050 | Munson | Apr. 25, 1882 |
| 580,806 | Scranton | Apr. 13, 1897 |
| 1,256,690 | Helgeson | Feb. 19, 1918 |
| 1,300,236 | Atherton | Apr. 15, 1919 |
| 1,462,487 | De Vry | July 24, 1923 |
| 1,828,569 | Kellogg | Oct. 20, 1931 |
| 1,927,615 | Ponti et al. | Sept. 19, 1933 |
| 2,116,735 | Stevens | May 10, 1938 |
| 2,153,666 | Hill | Apr. 11, 1939 |
| 2,161,341 | Fairbanks | June 6, 1939 |
| 2,531,702 | Reek et al. | Nov. 28, 1950 |
| 2,555,671 | Baia | June 5, 1951 |
| 2,574,218 | Lynch | Nov. 6, 1951 |
| 2,604,271 | Moomaw | July 22, 1952 |
| 2,639,333 | Howell et al. | May 19, 1953 |
| 2,652,204 | Haynes | Sept. 15, 1953 |
| 2,685,415 | Wittel et al. | Aug. 3, 1954 |
| 2,686,845 | Reed et al. | Aug. 17, 1954 |
| 2,700,904 | Woods | Feb. 1, 1955 |
| 2,705,639 | Lekas | Apr. 5, 1955 |
| 2,743,878 | Masterson | May 1, 1956 |
| 2,761,017 | Camras | Aug. 28, 1956 |
| 2,775,407 | Elliott et al. | Dec. 25, 1956 |
| 2,806,658 | Truesdale | Sept. 17, 1957 |